US012432230B2

(12) United States Patent
Wang et al.

(10) Patent No.: US 12,432,230 B2
(45) Date of Patent: Sep. 30, 2025

(54) RETRAINING SUPERVISED LEARNING THROUGH UNSUPERVISED MODELING

(71) Applicant: Entanglement, Inc., New York, NY (US)

(72) Inventors: Haibo Wang, Laredo, TX (US); Richard T. Hennig, Westminster, CO (US); John Lister, Ashburn, VA (US); Jason Turner, New York, NY (US); Rajesh Chawla, Arvada, CO (US)

(73) Assignee: Entanglement, Inc., Miami, FL (US)

( * ) Notice: Subject to any disclaimer, the term of this patent is extended or adjusted under 35 U.S.C. 154(b) by 46 days.

(21) Appl. No.: 18/510,490

(22) Filed: Nov. 15, 2023

(65) Prior Publication Data

US 2024/0163298 A1 May 16, 2024

Related U.S. Application Data

(60) Provisional application No. 63/384,067, filed on Nov. 16, 2022.

(51) Int. Cl.
*H04L 9/40* (2022.01)
*G06F 21/55* (2013.01)
*H04L 41/16* (2022.01)

(52) U.S. Cl.
CPC ........ *H04L 63/1416* (2013.01); *G06F 21/554* (2013.01); *H04L 41/16* (2013.01); *G06F 2221/034* (2013.01)

(58) Field of Classification Search
None
See application file for complete search history.

(56) References Cited

U.S. PATENT DOCUMENTS

| 10,484,429 B1 | 11/2019 | Fawcett |
| 11,100,373 B1 * | 8/2021 | Crosby ................. G16H 30/40 |

(Continued)

FOREIGN PATENT DOCUMENTS

KR 102337070 B1 12/2021

OTHER PUBLICATIONS

International Search Report and Written Opinion mailed Apr. 4, 2024, in International Application No. PCT/US2023/079914, filed Nov. 15, 2023, 8 pages.

(Continued)

*Primary Examiner* — Backhean Tiv
(74) *Attorney, Agent, or Firm* — Sheppard Mullin Richter & Hampton LLP

(57) ABSTRACT

Systems and methods are described for automated threat detection. For example, the system receives various types of unlabeled data and determines, through an unsupervised machine learning model, a label for the data. The labels are provided to a supervised machine learning model during a first training process. When new data is received, the supervised machine learning model is executed during an inference process to cluster the new data in accordance with the labels that were determined by the unsupervised machine learning model. In some examples, a label audit process may be implemented to update the cluster/output of the supervised machine learning model. The updated labels from the label audit process may be provided back to the supervised machine learning model during a second training process. In other words, the system may combine the unsupervised machine learning model with a supervised machine learning model to perform automated threat detection.

20 Claims, 11 Drawing Sheets

(56) References Cited

U.S. PATENT DOCUMENTS

| | | | |
|---|---|---|---|
| 11,417,102 B1* | 8/2022 | Meingast | G06V 10/16 |
| 11,455,570 B2* | 9/2022 | Abdulaal | G06N 7/01 |
| 11,457,031 B1* | 9/2022 | Bisht | H04L 63/1416 |
| 11,496,495 B2* | 11/2022 | Babu | G06F 16/285 |
| 11,899,760 B2 | 2/2024 | Groth | |
| 2011/0154132 A1 | 6/2011 | Aybay | |
| 2014/0325649 A1 | 10/2014 | Zhang | |
| 2016/0219071 A1* | 7/2016 | Vasseur | H04L 63/1425 |
| 2016/0330225 A1 | 11/2016 | Kroyzer | |
| 2018/0004948 A1* | 1/2018 | Martin | H04L 63/1425 |
| 2019/0102682 A1* | 4/2019 | Jayaraman | G06F 16/285 |
| 2019/0188212 A1* | 6/2019 | Miller | H04L 63/145 |
| 2019/0222596 A1* | 7/2019 | Abbaszadeh | G06F 21/554 |
| 2020/0226490 A1 | 7/2020 | Abdulaal | |
| 2020/0351283 A1* | 11/2020 | Salunke | H04L 63/1425 |
| 2020/0387797 A1* | 12/2020 | Ryan | G06N 3/084 |
| 2021/0110197 A1* | 4/2021 | Zamora Esquivel | G06N 3/048 |
| 2021/0142152 A1* | 5/2021 | Burkhart | G06F 18/24317 |
| 2021/0264300 A1* | 8/2021 | Staudinger | G06V 10/762 |
| 2021/0279644 A1* | 9/2021 | Givental | G06F 18/2321 |
| 2021/0281592 A1* | 9/2021 | Givental | G06N 20/10 |
| 2021/0374614 A1* | 12/2021 | Sampaio | G06N 20/00 |
| 2022/0012626 A1* | 1/2022 | Ben-Itzhak | G06V 10/7753 |
| 2022/0107744 A1 | 4/2022 | Capelo | |
| 2022/0188690 A1* | 6/2022 | Rawat | G06V 10/82 |
| 2022/0222568 A1* | 7/2022 | Mukherjee | G06N 20/00 |
| 2022/0255897 A1 | 8/2022 | Miele | |
| 2022/0343115 A1* | 10/2022 | Kanta | G06F 18/24 |
| 2022/0391639 A1 | 12/2022 | Gurumurthy | |
| 2023/0297716 A1 | 9/2023 | Bella | |
| 2023/0362180 A1* | 11/2023 | Vasic | G06N 20/10 |
| 2024/0163298 A1 | 5/2024 | Wang | |
| 2024/0184916 A1 | 6/2024 | Bella | |
| 2024/0346136 A1 | 10/2024 | Wang | |

OTHER PUBLICATIONS

International Search Report and Written Opinion mailed Mar. 8, 2024, in International Application No. PCT/US2023/079917, filed Nov. 15, 2023, 9 pages.

International Search Report and Written Opinion mailed Jul. 31, 2024, in International Application No. PCT/US2024/023888, filed Apr. 10, 2024, 8 pages.

* cited by examiner

Lateral movement
132MB was transfered from 10.1.0.29 to 192.168.1.1 at 9:32 AM EVENTS (40)                                                                                 Showing: All Columns ⌄

| Source IP | Destination IP | Source Port | Destination Port | Protocol | Bytes | Time |
|---|---|---|---|---|---|---|
| 10.24.1.18 | 192.168.3.8 | 38214 | 22 | SSH | 92 | 10:24 PM |
| 10.24.1.18 | 192.168.3.8 | 38214 | 22 | SSH | 92 | 10:24 PM |
| 10.24.1.18 | 192.168.3.8 | 38214 | 22 | SSH | 92 | 10:24 PM |
| 10.24.1.18 | 192.168.3.8 | 38214 | 22 | SSH | 92 | 10:24 PM |
| 10.24.1.18 | 192.168.3.8 | 38214 | 22 | SSH | 92 | 10:24 PM |

INFORMATION

Is this a real threat?

☐ YES    ✕ NO

⇧ SHARE    ⤓ DOWNLOAD

FIG. 8

RETRAINING SUPERVISED LEARNING THROUGH UNSUPERVISED MODELING

CROSS-REFERENCE TO RELATED APPLICATION

This application is a non-provisional patent application of U.S. patent application Ser. No. 63/384,067, filed Nov. 16, 2022, which is herein incorporated by reference.

This application is also related to U.S. patent application Ser. No. 18/510,477, filed Nov. 15, 2023, entitled "AUTOMATED THREAT DETECTION SYSTEM", International Application No. PCT/US2023/079914, filed Nov. 15, 2023, entitled "AUTOMATED THREAT DETECTION SYSTEM", and International Application No. PCT/US2023/079917, filed Nov. 15, 2023, entitled "RETRAINING SUPERVISED LEARNING THROUGH UNSUPERVISED MODELING", which are herein incorporated by reference.

BACKGROUND

Traditional computer systems have inherent and hard to find vulnerabilities that can allow unpermitted access to these systems. Threat detection is often provided to try to identify when the unpermitted access is initiated. However, by the time that the fraudster has access to the computer system, it may be too late to remediate the unpermitted access and further protect the sensitive data and corresponding systems. Better methods are needed.

BRIEF DESCRIPTION OF DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 8 is an example threat detection display, in accordance with some of the embodiments disclosed herein.

Figure 1:
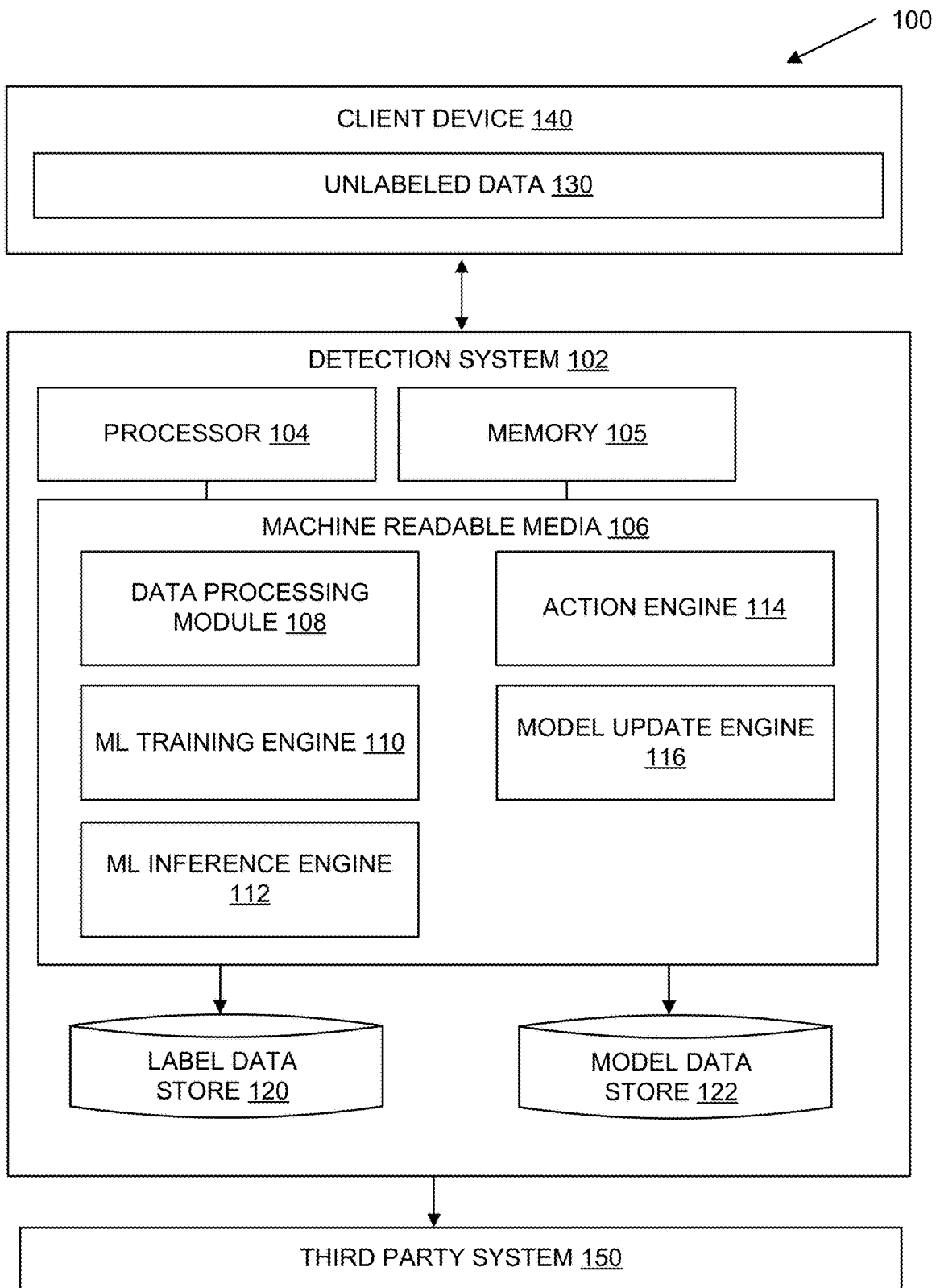
FIG. 1 is a computer system for performing automated threat detection, in accordance with some of the embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

In some examples, the system receives various types of unlabeled data, including network data. The system determines, through an unsupervised machine learning model, a label for the data (e.g., "1" for outlier data and "0" for normal data). The labels are provided to a supervised machine learning model during a first training process. When new data is received, the supervised machine learning model is executed during an inference process to cluster the new data in accordance with the labels that were determined by the unsupervised machine learning model. In some examples, a label audit process may be implemented to update the cluster/output of the supervised machine learning model. The updated labels from the label audit process may be provided back to the supervised machine learning model during a second training process. In other words, the system may combine the unsupervised machine learning model with a supervised machine learning model to perform automated threat detection.

In some examples, the system implements a label audit process using a series of quadratic unconstrained binary optimization (QUBO) problems with a solver program, solving the series of QUBO problems with a quantum or quantum-inspired computer, and converting the QUBO solutions to initiate a threat detection with the solver program.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 is a computer system for performing automated threat detection, in accordance with some of the embodiments disclosed herein. In example 100, detection system 102 comprises processor 104, memory 105, and machine readable media 106. Detection system 102 may be a server computer that communicates via network communications to other devices accessible on the network, including client device 140 and third party system 150. Detection system 102 may receive unlabeled data 130 (e.g., network traffic, sensor data, firewall data, IoT data, or other telemetry data) from client device 140 and third party system 150 in a distributed communication environment.

Processor 104 may comprise a general-purpose or special-purpose processing engine such as, for example, a microprocessor, controller, or other control logic. Processor 104 may be connected to a bus, although any communication medium can be used to facilitate interaction with other components of detection system 102 or to communicate externally.

Memory 105 may comprise random-access memory (RAM) or other dynamic memory for storing information and instructions to be executed by processor 225. Memory 105 might also be used for storing temporary variables or other intermediate information during execution of instructions to be executed by processor 104. Memory 105 may also comprise a read only memory ("ROM") or other static storage device coupled to a bus for storing static information and instructions for processor 104.

Machine readable media 106 may comprise one or more interfaces, circuits, and modules for implementing the functionality discussed herein. Machine readable media 106 may carrying one or more sequences of one or more instructions processor 104 for execution. Such instructions embodied on machine readable media 106 may enable detection system 102 to perform features or functions of the disclosed technology as discussed herein. For example, the interfaces, circuits, and modules of machine readable media 106 may comprise, for example, data processing module 108, ML training engine 110, ML inference engine 112, action engine 114, and model update engine 116.

Data processing module 108 is configured to receive data from client device 140, including end user devices, sensors, or software systems. The source of the data may comprise sensors, IoT devices, satellite, third party entities (e.g., Netflow, Zeek, CrowdStrike, vpcFlow, Elk, Splunk, cloud storage sources, Tanium, ICS, SCADA, or Tenable), or other end user devices. The format of the data may comprise a structured format, such as JSON, XML, or binary. In some examples, the data is ingested by collecting, receiving, and storing the data generated by the client device.

In some examples, the data may comprise various telemetry data, including streaming or batched data. The term "telemetry" may correspond with remote measurement and transmission of information about the client device. In some examples, the data may include information about the performance, security, status, and behavior of the client device.

The data may be generated by client device 140 corresponding to a sensor, IoT device, server, network equipment, or application installed at client device 140. In some examples, the source of the data may continuously generate the data, which is transmitted via a network to detection system 102 and processed by data processing module 108. The transmission of the data may be transmitted using different protocols like HTTP, MATT, or custom protocols specific to the application or industry of the particular embodiment.

In some examples, the data received by client device 140 is unlabeled data. The information received with the data can include a data packet header, payload, or metadata that is added during the transmission of the data. In this sense, the data packet header, payload, or metadata that is added during the transmission of the data may not correspond with the label added by detection system 102 later in the process. Instead, the label added by detection system 102 may correspond with data characteristics of the data that can identify the type of data upon analysis of the data packet, and the label added by detection system 102 may not be provided with the data as it is received by detection system 102.

ML training engine 110 is configured to train both unsupervised machine learning models and supervised machine learning models. Various training methods are described herein and implementation of any of these training methods will not divert from the essence of the disclosure.

In some examples, the unsupervised machine learning model may correspond with clustering (e.g., k-means, hierarchical clustering), dimensionality reduction (e.g., PCA, t-SNE), association rule learning, or other unsupervised machine learning models. When clustering is implemented, the process may identify natural groupings or clusters in the data, based on a data characteristic, and generate a label associated with that characteristic. When dimensionality reduction is implemented, the process may reduce the number of input variables or features under consideration to simplify the complexity of the dataset by transforming it into a lower-dimensional space while preserving important information. When association rule learning is implemented, the process aims to discover relationships, patterns, or associations within the unlabeled data, and generate a label for the corresponding data. In any of these instances, the unsupervised machine learning model may generate or assign a label that corresponds with "1" for outlier data and "0" for normal data.

The unsupervised machine learning models may be trained on unlabeled data to assign or generate a label for the unlabeled data. The unlabeled data may be received without labeled outputs or target variables. In an illustrative example, the data may comprise security logs from client device 140 and the unsupervised machine learning model may be trained to label the data. The labels may correspond with "1" (yes, a security log) or "0" (not a security log) and may be assigned by the unsupervised machine learning model. In another example, the label may correspond with "1" (e.g., normal data) or "0" (e.g., outlier data) based on the characteristics of the data. In another example, the label may correspond with multiple values, including a value associated with one or more data characteristics (e.g., non-binary label). The label determined during the training process may be stored in label data store 120.

In some examples, the unsupervised machine learning model may identify new data types that are included with the unlabeled data from client device 140. When new data is identified (e.g., when the characteristics of the data do not match pre-existing data characteristics that are previously assigned to labels), a new or second label may be generated and assigned to the unlabeled data. The label that is generated during the training process may be stored in label data store 120.

In some examples, the unsupervised machine learning model may determine a new or second label associated with outliers in the data. The outlier may correspond with data that is not similar to previously identified activities in the system, including non-fraudulent or fraudulent activities, and a label corresponding with the outlier may be generated and assigned to the data.

ML training engine 110 is also configured to train a supervised machine learning model. The supervised machine learning model may be trained using the label that was determined from the unsupervised machine learning model and stored in label data store 120.

In some examples, the supervised machine learning model may correspond with linear regression, decision trees, support vector machines, neural networks, or other supervised machine learning models. Training the supervised machine learning model may begin by initializing the model with random or predefined parameters that can be adjusted during the training. When the label that was determined from the unsupervised machine learning model is provided as input to the supervised machine learning model (e.g., by accessing label data store 120), the process iteratively adjusts parameters of the model to minimize the difference between its predictions and the true labels. In some examples, a loss function may also be implemented to quantify the error between the predicted outputs and the true labels. The loss function may be minimized during training.

In some examples, an optimization function is implemented to adjust the parameters of the model iteratively. An illustrative process to adjust the parameters is gradient descent, although various optimization functions may be implemented. In some examples, the gradient of the loss function may be calculated with respect to the model parameters. The parameters may be updated in the opposite direction of the gradient to minimize the loss.

The trained supervised machine learning model may be stored in a model data store 122 as a trained machine learning model. The trained machine learning model may be used during an inference process when new unlabeled data is received by detection system 102.

ML inference engine 112 is configured to initiate an inference process using the trained models stored in model data store 122. The trained machine learning model may make predictions or generate outputs for new unlabeled data. For example, once the supervised machine learning model is trained on a labeled dataset (e.g., that has been labeled using the unsupervised machine learning model), the machine learning models stored in model data store 122 can be deployed for inference of the new data.

The inference process may comprise, for example, providing the unlabeled data to the trained model as input. The processing of the data may vary based on the type of model to be associated with the unlabeled data. For example, in a neural network, the model may receive the unlabeled data as input and process it through the layers of the neural network to generate output. The output of the neural network may provide determined similarities between previously received data and new data (e.g., whether the new data is similar or not similar to the previously received data with respect to a similarity threshold). In decision trees, the model may receive the unlabeled data as input and process it through its decision boundaries. In either of these implementations, the model may generate a prediction as output of the unlabeled data.

ML inference engine 112 is also configured to generate a set of clusters of labeled data as the prediction/output of the model. In creating the set of clusters, the model may apply the learned patterns and relationships determined during training to the new data. In some examples, the model may generate clustered data with the highest probability of corresponding with the unlabeled data, and group each set of similar data (within a similarity threshold) in the common cluster. In some examples, the output may comprise a confidence score that the data corresponds with the particular cluster (e.g., normal data) or does not correspond with any cluster (e.g., outlier data).

ML inference engine 112 is also configured to generate a confidence score associated with the inference process for the likelihood that the unlabeled data is to be grouped in the clustered data. The confidence score may identify the probability that the supervised machine learning model assigns to the prediction or classification.

Various confidence scores may be implemented. For example, a confidence score may be determined for each cluster and the greatest confidence score associated with the particular cluster may determine which cluster the data are assigned. In other examples, confidence score for a positive cluster may exceed a predetermined threshold (e.g., 0.5), the supervised machine learning model might predict it as the positive cluster/group. Otherwise, the supervised machine learning model may predict the opposite or a negative cluster/group. In this sense, the confidence score may be used as a thresholding for classification.

In some examples, the confidence score may correspond with the determination that the unlabeled data is outlier data. In other words, the unlabeled data corresponds with data that is previously unlabeled and not similar to other previously labeled data in the system. A correlation may exist between the confidence score and the determination of outlier data, including an instance when the data is not similar to existing data. In some examples, an action may be recommended or initiated (e.g., to remedy a potential threat).

Action engine 114 is configured to initiate an action in association with the data received from the client device. For example, in response to detecting a threat or unpermitted access to the client device in the data, or in response to identifying outlier data, the action may be initiated. In some examples, the action may be to add the data to an outlier queue for further review.

In some examples, the action corresponds with remediating the detected threat. In some examples, the action may refer to the steps taken to mitigate or eliminate a network threat once it has been identified, which can provide a technical improvement for the system overall. The system may respond quickly to a network threat to improve cybersecurity, minimize potential damage, and potentially prevent further compromise.

The action may comprise initiating an isolation of the affected systems to prevent the threat from spreading further. This might involve disconnecting or transmitting an alert to recommend disconnecting the compromised client device from the network. In other examples, the action may implement network segmentation to separate or contain the impact of the detected threat.

The action may comprise a recommendation to initiate an investigation to understand the nature and scope of the threat. The action may involve analyzing data/security logs, network traffic, or other sources. The investigation may help identify the source, methods, and potential impact of the threat. In other examples, the investigation may help determine the vulnerabilities that allowed the threat to access the client device. For example, the action can identify outdated software, misconfigurations, or other weaknesses in the network infrastructure, suggest updating patches or security tools, changing access credentials, or other actions in response to the detected threat.

In some examples, the action may include updating an application programming interface (API), dashboard, or other display. Various examples of the API, dashboard, or display are provided with FIGS. 5-8.

Model update engine 116 is configured to review output from the supervised machine learning model and, in some examples, validate or update the results from the model. In some examples, the model update engine 116 may initiate a label auditing process. During the label auditing process, model update engine 116 may revise labels associated with particular data or data characteristics. For example, the data associated with the label may be measured for similarity. The data value that is greater than a predetermined threshold value may be provided for further review. In some examples, additional labels may be added by a human user to output from the supervised machine learning model.

In some examples, the labels that are determined during the label auditing process may be provided back to the supervised machine learning model to retrain the model during a second training process. The retrained supervised machine learning model may be stored in model data store 122 and/or provided for future inference processes on new data that is received from client device 140.

Unlabeled data 130 may comprise any data that is received at detection system 102 via network communications from client device 140. In some examples, client device 140 may generate unlabeled data, including network traffic, sensor data, firewall data, IoT data, or other telemetry data. The labeling aspect of the unlabeled data may correspond with a machine learning model that has associated a particular label to the unlabeled data from client device 140, including an unsupervised machine learning model. The data generated by client device 140 may correspond with metadata or other characteristics of the data, without also corresponding with a label. In some examples, unlabeled data 130 may be aggregated and characterized by detection system 102 using data processing module 108 as described herein. In some examples, unlabeled data 130 is processed or filtered according to methods and systems described herein.

Client device 140 is configured to generate, transmit, and receive data from detection system 102. Client device 140 may be any end user devices, sensors, or software systems. The source of the data may comprise sensors, IoT devices, satellite, third party entities (e.g., Netflow, Zeek, CrowdStrike, vpcFlow, Elk, Splunk, cloud storage sources, Tanium, ICS, SCADA, or Tenable), or other end user devices. The format of unlabeled data 130 may comprise a structured format, such as JSON, XML, or binary. In some examples, unlabeled data 130 is ingested by collecting, receiving, and storing the data generated by client device 140.

Third party device 150 is configured to perform secondary analysis on the data associated with client device 140. In some examples, third party device 150 corresponds with Security Information and Event Management (SIEM) that provides a secondary analysis of security alerts generated by detection system 102. In some examples, SIEM may combine the alerts from detection system 102 with other security event data to perform monitoring, detection, and response actions for potential threats.

In some examples, third party device 150 corresponds with a cyber stack system that includes tools and data inventory related to cyber security. In some examples, the cyber stack system may comprise a device to evaluate software security, a device to evaluate the security practices of the developers and suppliers, and a device to analyze and provide feedback with respect to conforming the data/devices with secure practices.

Figure 2:
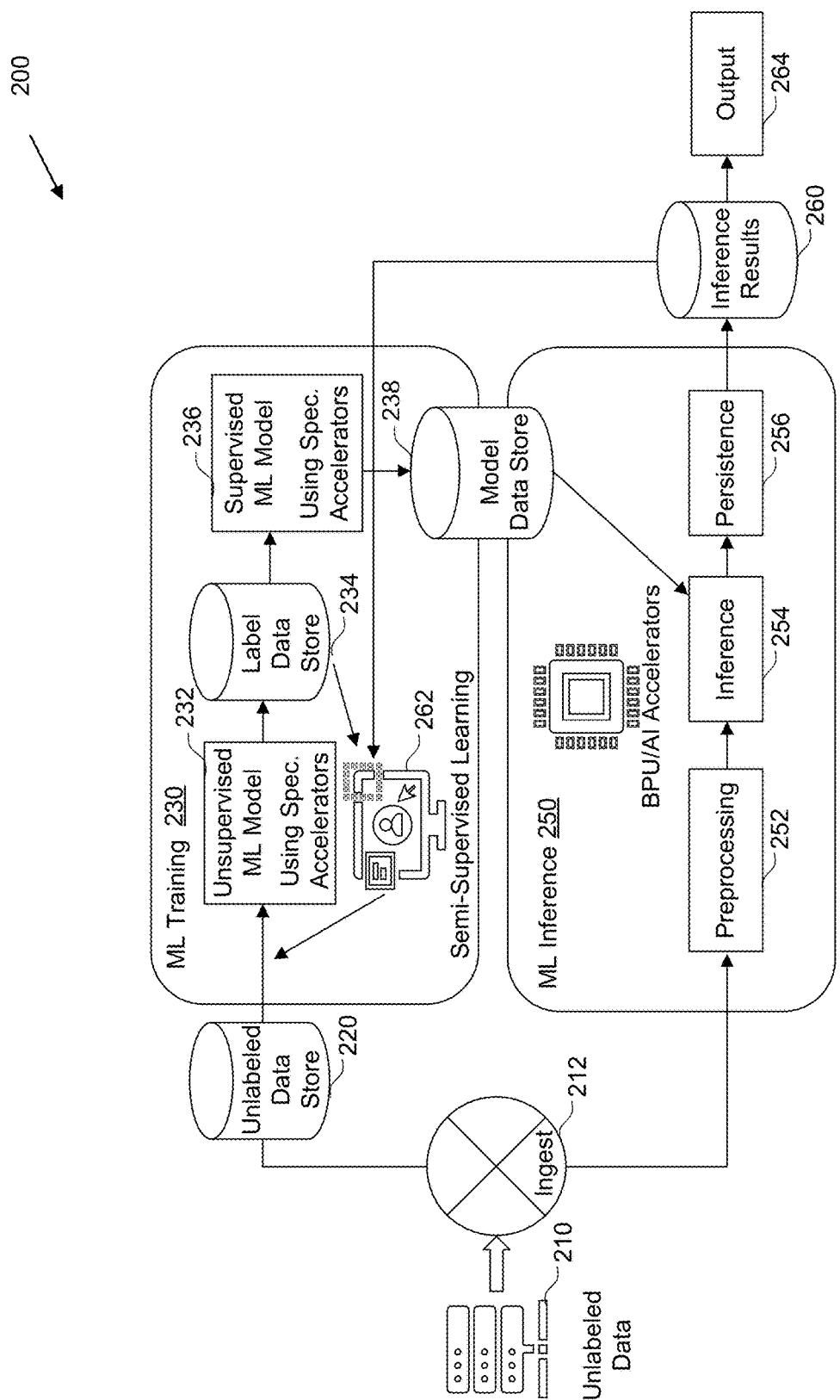
FIG. 2 is a diagram showing a logical architecture for performing threat detection, in accordance with some of the embodiments disclosed herein.

FIG. 2 is a diagram showing a logical architecture for performing automated threat detection, in accordance with some of the embodiments disclosed herein. In example 200, detection system 102 of FIG. 1 may execute machine-readable instructions to perform the operations described herein.

In some examples, specialized hardware is provided to execute one or more of the blocks illustrated herein. For example, the processes described herein may be implemented across multiple servers and using multiple architectures. In some examples, different accelerators and different hardware may be implemented to expedite processing.

At block 210, unlabeled data is received. The unlabeled data may include data from a client device, including end user devices, sensors, or software systems. The data may comprise various telemetry data, including streaming or batched data. The unlabeled data may correspond with remote measurement and transmission of information about the client device and, in some examples, may include information about the performance, security, status, and behavior of the client device. In some examples, the unlabeled data may include a data packet header, payload, or metadata that is added during the transmission of the data. In this sense, the data packet header, payload, or metadata that is added during the transmission of the data may not correspond with the label added later in the process (e.g., at block 232).

In some examples, the data may be generated by the client device by a sensor, IoT device, server, network equipment, or application associated with the client device. The source of the data may comprise sensors, IoT devices, satellite, third party entities, or other end user devices. In some examples, the source of the data may continuously generate the data. The transmission of the data may be transmitted using different protocols like HTTP, MATT, or custom protocol.

At block 212, unlabeled data is ingested. For example, when the unlabeled data is telemetry data, the ingesting may include collecting, receiving, and incorporating raw data generated by the client device. The unlabeled data may include information regarding the performance, status, and behavior of these systems. The ingesting process may include storing the data in an unlabeled data repository or data store.

In some examples, the ingesting process may include a data acceptance and validation process to help ensure that incoming data is accurate, reliable, and consistent before the data are stored in the unlabeled data repository or data store. For example, the process may verify that the data adheres to predefined criteria, like data format, data type, and expected size. In another example, the integrity of the data may be analyzed to determine whether the data are altered or corrupted during transmission or storage. This may include checking for checksums, digital signatures, or hashing algorithms to verify data integrity. In other examples, the data are checked against predefined standards or schema to ensure that it aligns with the expected format, structure, and content, including a comparison to specific data models or industry standards.

In some examples, the ingesting process may include filtering, aggregation, and transformation. For example, filtering of the unlabeled data may remove specific subsets of data based on predefined criteria, like specific values, ranges, patterns, or characteristics within the unlabeled data. In another example, aggregation may combine information from multiple individual data points in the unlabeled data by summing, averaging, counting, or finding maximum or minimum values within groups or categories in the unlabeled data. In some examples, the unlabeled data may be converted to a different data type or protocol/format or added with missing values.

In some examples, the ingesting process may identify discrepancies or issues in the unlabeled data. The issues may be added to an audit log and may trigger an action (e.g., to retransmit the unlabeled data or restart the client device).

At block 220, ingested data is stored in the unlabeled data repository or data store. In some examples, the unlabeled data may be used as baseline data for multiple ML training processes (block 230). The unlabeled data may correspond with data received from the client device and labeled, at a first time, using the unsupervised machine learning model.

At block 230, the unlabeled data is used to train one or more machine learning models using a multi-step training process. The ML training may be performed asynchronously with receiving the unlabeled data. In some examples, the training process comprises blocks 232, 234, 236, or 262, or any subset thereof.

At block 232, an unsupervised machine learning model is initiated. For example, the unsupervised machine learning model may correspond with clustering (e.g., k-means, hierarchical clustering), dimensionality reduction (e.g., PCA, t-SNE), association rule learning, or other unsupervised machine learning models. When clustering is implemented, the process may identify natural groupings or clusters in the data, based on a data characteristic, and generate a label associated with the data characteristic. When dimensionality reduction is implemented, the process may reduce the number of input variables or features under consideration to simplify the complexity of the dataset by transforming it into a lower-dimensional space while preserving important information. The reduction in the complexity of the dataset may help identify fewer labels by the unsupervised machine learning model. When association rule learning is implemented, the process aims to discover relationships, patterns, or associations within the unlabeled data, and generate a label for the corresponding data.

The unsupervised machine learning model may be trained on unlabeled data (received from block 220) to assign or generate a label for the unlabeled data. The unlabeled data may be received without labeled outputs or target variables. In an illustrative example, the label may correspond with "1" (e.g., outlier data) or "0" (e.g., normal data) based on the characteristics of the data. The label determined during the training process may be stored in a label data store (block 234).

In some examples, the unsupervised machine learning model may identify new data types that are included with the unlabeled data from the client device. When new data is identified (e.g., when the characteristics of the data do not match pre-existing data characteristics that are previously assigned to labels), a new or second label may be generated and assigned to the unlabeled data. The label that is generated during the training process may be stored in label data store (block 234).

In some examples, the unsupervised machine learning model may determine a new or second label associated with outliers in the data. The outlier may correspond with data that is not similar to previously identified activities in the system, including non-fraudulent or fraudulent activities, and a label corresponding with the outlier may be generated and assigned to the data.

At block 234, the labeled training data is generated by the unsupervised machine learning model at block 232 and stored in label data store.

At block 236, a training of a supervised machine learning model is initiated. For example, the supervised machine learning model may be trained using the label that was determined from the unsupervised machine learning model and stored in label data store (block 234).

In some examples, the supervised machine learning model may correspond with linear regression, decision trees, support vector machines, neural networks, or other supervised machine learning models. Training the supervised machine learning model may begin by initializing the model with random or predefined parameters that can be adjusted during the training. When the label that was determined from the unsupervised machine learning model is provided as input to the supervised machine learning model (e.g., by accessing label data store 120), the process iteratively adjusts parameters of the model to minimize the difference between predictions and the true labels. In some examples, a loss function may also be implemented to quantify the error between the predicted outputs and the true labels. The loss function may be minimized during training.

In some examples, an optimization function is implemented to adjust the parameters of the model iteratively. An illustrative process is gradient descent, although various optimization functions may be implemented. In some examples, the gradient of the loss function may be calculated with respect to the model parameters. The parameters may be updated in the opposite direction of the gradient to minimize the loss. The ML training module may output a trained ML model to model data store 238. The trained machine learning model may be used during an inference phase of the machine learning model when new unlabeled data is received.

At block 250, an inference process may be initiated using the trained machine learning model. In some examples, the data is used to infer threats and to help implement automated threat detection. In some examples, the inference process comprises blocks 252, 254, and 256, or any subset thereof.

At block 252, the inference process may implement preprocessing of the data. For example, after the unlabeled data is ingested (block 212), the data may be partitioned and provided for preprocessing. The ingesting/preprocessing may remove specific subsets of data based on predefined criteria, combine information from multiple individual data points in the unlabeled data, or convert the data to a different data type or protocol/format or added with missing values. In some examples, the data may be split so that a first portion of the data is used for training (e.g., with block 230) and a second portion of the data is used for inference (e.g., with block 250).

Various preprocessing methods may be implemented. For example, the inference process may implement feature scaling to adjust the scale of the features to correspond to a similar range as each other. In some examples, the preprocessing includes dimensionality reduction to reduce the number of input features while preserving important information. The identification and reduction of input features may be implemented using PCA (Principal Component Analysis) or other feature selection methods. In some examples, the inference process normalizes the data from the ingesting process (block 212) to help ensure that the incoming data is in the same format and range as the data used during model training (block 230).

In some examples, the preprocessing may generate new data using oversampling, undersampling, or using weighted classes to handle imbalanced data. The imbalanced data may exist in the distribution of clusters or other groupings of data. The newly generated data may help prevent biased inferences as output (block 260).

At block 254, inference may be initiated by accessing one or more supervised ML models stored in model data store 238 and providing the data received from preprocessing (block 252) as input. The model may generate a set of clustered data in accordance with the labels that were determined by the unsupervised machine learning model.

The label associated with the data may be used to access a corresponding supervised ML model stored in model data store 238. As one illustrative example, particular telemetry data may be associated with a particular model stored in model data store 238. When new telemetry data is received that is similar to the previously received telemetry data, the new telemetry data may also be associated with the particular model stored in model data store 238 and the new data may be provided as input to the ML model.

At block 256, the process may initiate a persistence process. The learned parameters, weights, structure, or other relevant information can be accessed from model data store 238 and correlated with the output from inference process at block 254. Upon completion, the ML model may retain the state it achieved after training, including the learned parameters that were optimized during the training process.

At block 260, the inference results/output may be stored in a data store and, in some examples, initiate a label auditing process. During the label auditing process, the process may update labels associated with particular data or data characteristics. For example, the data associated with the label may be measured for similarity. The data value that is greater than a predetermined similarity threshold value may be provided for further review. In some examples, additional labels may be added by a human user to output from the supervised machine learning model.

In some examples, the labels that are determined during the label auditing process may be provided back to a supervised machine learning model (block 262) to retrain the unsupervised machine learning model during a second training process (block 232). The retrained supervised machine learning model may be stored in model data store (block 238) and/or provided for future inference processes on new data. The output from the label auditing may be used to implement automated detection of potential threats. The newly-discovered potential threats may be provided to a supervised machine learning module (block 262) for analysis and inclusion in the ML model.

At block 262, the unsupervised machine learning model may be retrained with the labels identified during the label auditing process that may correspond with the fraudulent activity. The retrained model may be updated at block 232. Using the retrained model, any new data that is received/ingested may be received by unsupervised machine learning model. The pre-existing labeled data can be clustered with the previously-identified clusters and any new data that is not clustered can be identified as a new outlier.

At block 264, an action may be initiated. For example, in response to detecting a threat or unpermitted access to the client device in the data, the action may correspond with remediating the threat. In some examples, the action may refer to the steps taken to mitigate or eliminate a network threat once it has been identified, which can provide a technical improvement for the system overall. The system may respond quickly to a network threat to improve cybersecurity, minimize potential damage, and potentially prevent further compromise.

In some examples, the action may comprise initiating an isolation of the affected systems to prevent the threat from spreading further. This might involve disconnecting or transmitting an alert to recommend disconnecting the compromised client device from the network. In other examples, the action may implement network segmentation to separate or contain the impact of the detected threat.

The action may comprise a recommendation to initiate an investigation to understand the nature and scope of the threat. The action may involve analyzing data/security logs, network traffic, or other sources. The investigation may help identify the source, methods, and potential impact of the threat. In other examples, the investigation may help determine the vulnerabilities that allowed the threat to access the client device. For example, the action can identify outdated software, misconfigurations, or other weaknesses in the network infrastructure, suggest updating patches or security tools, changing access credentials, or other actions in response to the threat.

In some examples, the action may include updating an application programming interface (API), dashboard, or other display. Various examples of the API, dashboard, or display are provided with FIGS. 5-8.

Figure 3:
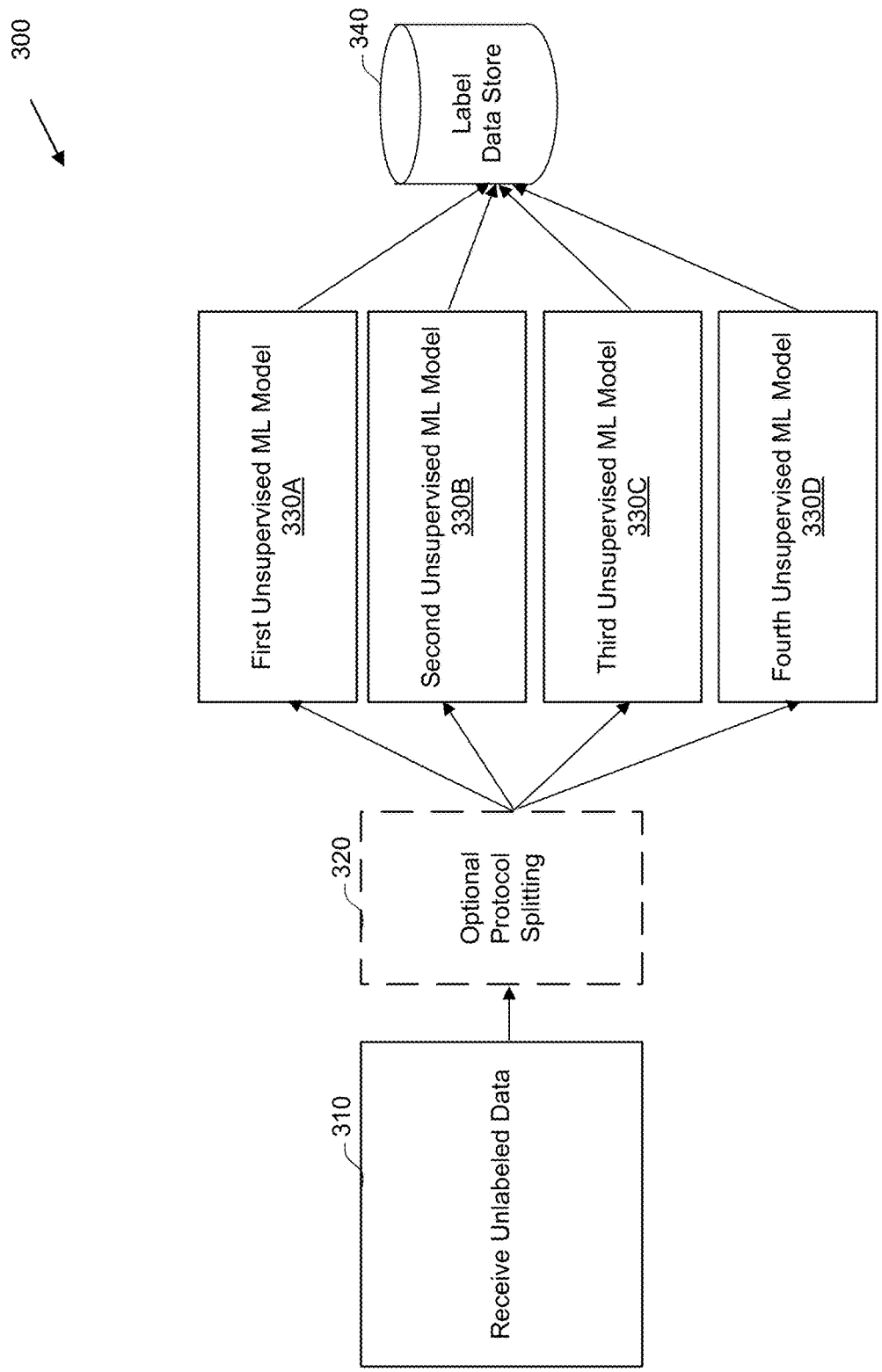
FIG. 3 is an illustrative process of unsupervised machine learning model for generating labeled training data for a supervised machine learning model, in accordance with some of the embodiments disclosed herein.

FIG. 3 is an illustrative process of unsupervised machine learning model for generating labeled training data for a supervised machine learning model, in accordance with some of the embodiments disclosed herein. In example 300, detection system 102 illustrated in FIG. 1 may execute machine-readable instructions to perform the operations described herein.

At block 310, the unsupervised machine learning model may receive unlabeled data from the client device, as described herein.

At block 320, when the unlabeled data is associated with telemetry data, the process may define the codec associated with the data and initiate an optional protocol splitting process. The codec or other algorithm used to compress and decompress the data for transmission, storage, or playback, may be determined, including an audio codec (e.g., MP3, AAC, or FLAC), video codec (e.g., H.264, H.265 or HEVC, VP9, or AV1), or image codec (e.g., JPEG, PNG, or WebP).

In some examples, the unlabeled data may be associated with a predefined codec in order to associate the unlabeled data with a particular unsupervised machine learning model. In other examples, the data label may correspond with the codec or other data characteristic. One or more unsupervised machine learning models may be trained and stored for each type of codec or label.

At block 330, various unsupervised machine learning models may be stored and used to determine the data label for the unlabeled data. The determination of the particular unsupervised machine learning model may be matched with the codec (e.g., when the data is telemetry data) or other data characteristic. In this illustration, a set of unsupervised machine learning models are stored in model data store, including a first unsupervised machine learning model 330A, second unsupervised machine learning model 330B, third unsupervised machine learning model 330C, and fourth unsupervised machine learning model 330D.

In some examples, the unsupervised machine learning model may determine whether the data is normal data or outlier data. In determining the normal data and the outlier data, the unsupervised machine learning model may compare a set of data characteristics of normal data to the new, unlabeled data. At a first time, a first label of a set of labels may be assigned to the unlabeled data using an unsupervised machine learning model. This may correspond with normal data that is identified in a first set of unlabeled data. At a second time, second unlabeled data may be received. The second unlabeled data may be provided to a particular unsupervised machine learning model based on a data characteristic. When the data characteristic exists and is assigned to an existing unsupervised machine learning model, the particular unsupervised machine learning model may be selected to assign the label to the unlabeled data. The label may correspond with the first label of the set of labels that was assigned to the first labeled data. In this example, the same label may be assigned to the second unlabeled data because the unlabeled data may be similar to the first unlabeled data based on the set of data characteristics. This may also correspond with normal data that is identified in a second set of unlabeled data. When the data is not similar to the first unlabeled data or any corresponding data characteristics of the first unlabeled data, a second label may be generated and assigned to the second set of labeled data. The second label may be stored with the set of labels and correspond to a second set of the second unlabeled data that is not similar to the first unlabeled data based on the set of data characteristics.

In some examples, the unsupervised machine learning model may correspond with clustering (e.g., k-means, hierarchical clustering), dimensionality reduction (e.g., PCA, t-SNE), association rule learning, or other unsupervised machine learning models. When clustering is implemented, the process may identify natural groupings or clusters in the data, based on a data characteristic, and generate a label associated with that characteristic. When dimensionality reduction is implemented, the process may reduce the number of input variables or features under consideration to simplify the complexity of the dataset by transforming it into a lower-dimensional space while preserving important information. When association rule learning is implemented, the process aims to discover relationships, patterns, or associations within the unlabeled data, and generate a label for the corresponding data. In any of these instances, the unsupervised machine learning model may generate or assign a label that corresponds with "1" for outlier data and "0" for normal data.

The unsupervised machine learning models may be trained on unlabeled data to assign or generate a label for the unlabeled data. The unlabeled data may be received without labeled outputs or target variables. In an illustrative example, the label may correspond with "1" (e.g., normal data) or "0" (e.g., outlier data) based on the characteristics of the data. In another example, the label may correspond with multiple values, including a value associated with one or more data characteristics (e.g., non-binary label).

In some examples, the unsupervised machine learning model may identify new data types that are included with the unlabeled data from the client device. When new data is identified (e.g., when the characteristics of the data do not match pre-existing data characteristics that are previously assigned to labels), a new or second label may be generated and assigned to the unlabeled data.

In some examples, the unsupervised machine learning model may determine a new or second label associated with outliers in the data. The outlier may correspond with data that is not similar to previously identified activities in the system, including non-fraudulent or fraudulent activities, and a label corresponding with the outlier may be generated and assigned to the data.

In some examples, the determination of the particular unsupervised machine learning model may use an ensemble of models by including first unsupervised machine learning model 330A, second unsupervised machine learning model 330B, third unsupervised machine learning model 330C, and fourth unsupervised machine learning model 330D. Each of unsupervised machine learning models 330 may correspond with an ensemble of models. For example, when an anomaly detection ensemble is implemented, the unsupervised machine learning model may combine multiple anomaly detection algorithms or use different strategies to detect outliers in data. A data characteristic identified by the unsupervised machine learning model can be used as the data label. In some examples, ensemble and voting are implemented to generate and assign the labels.

At block 340, the label determined by the unsupervised machine learning model may be stored in a label data store. The data may comprise a set of labels and a set of characteristics associated with the unlabeled data.

Figure 4:
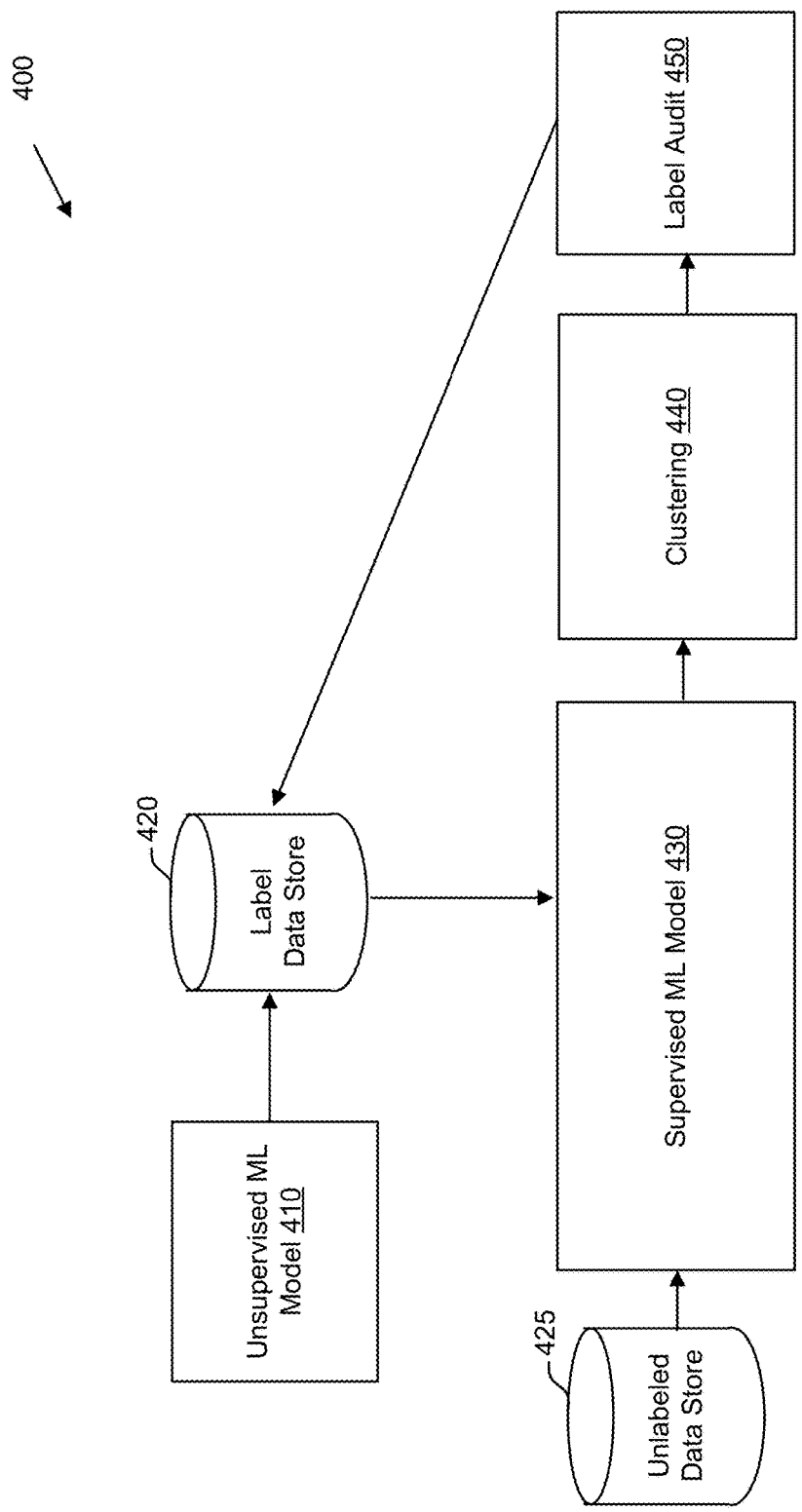
FIG. 4 is an illustrative inference process using a supervised machine learning model, in accordance with some of the embodiments disclosed herein.

FIG. 4 is an illustrative inference process using a supervised machine learning model, in accordance with some of the embodiments disclosed herein. In example 400, detection system 102 illustrated in FIG. 1 may execute machine-readable instructions to perform the operations described herein. In some examples, the unsupervised machine learning model may be trained to determined labels for unlabeled data from the client device, as described herein.

At block 410, the unsupervised machine learning model generates a set of labels. The labels may represent normal data and outlier data. For example, the label may correspond with "1" for outlier data and "0" for normal data.

At block 420, the label determined during the training process of the unsupervised machine learning model may be stored in label data store. The label may be accessed by the supervised machine learning model to cluster/group data (block 430) and/or may be updated by the label audit process (block 450).

At block 430, the supervised machine learning model may receive unlabeled data from the data repository/data store at block 425 as input during an inference process. When the data are received, the labels are generated/assigned using the unsupervised machine learning model and the supervised machine learning model is executed to cluster the new data in accordance with the labels that were determined by the unsupervised machine learning model.

In some examples, an ensemble of supervised machine learning models is implemented, which combines multiple models. For example, the supervised machine learning model may implement a Random Forest ensemble method that includes multiple instances of the same learning algorithm on different subsets of the training data to build diverse models. In another example, the supervised machine learning model may implement a voting process that includes combining predictions from multiple models and selecting the final output based on majority voting or a weighted averaging of individual model predictions.

At block 440, similar events identified in the unlabeled data (which has been assigned a label by the unsupervised machine learning model) may be clustered during the inference process using the supervised machine learning model. For example, the events that are associated with the first label that existed in the label data store may be considered normal data and the data that are associated with the second label that did not exist in the label data store may be considered outlier data.

At block 450, a label audit process may update the cluster/output of the supervised machine learning model. During the label auditing process, the data associated with the label may be measured for similarity. The data value that is greater than a predetermined similarity threshold may be provided for further review. The labels may be revised or added by human or automated input. In some examples, the data are provided to a display or real-time API to receive an interaction from the user to help relabel the clustered data.

The revised or added labels may be added back to the label data store (block 420) to initiate a second training process of the supervised machine learning model (block 430). The second training process may combine the labels generated/assigned from the unsupervised machine learning model and the label auditing process to generate an improved supervised machine learning model (block 430). The improved supervised machine learning model may be retrieved from the model data store and executed on new data during a future inference process of the new data.

Figure 5:
FIG. 5 is an example threat detection display, in accordance with some of the embodiments disclosed herein.

FIG. 5 is an example threat detection display, in accordance with some of the embodiments disclosed herein. In example 500, a display is illustrated with a data timeline and potential outlier data in association with automated threat detection. In some examples, detection system 102 illustrated in FIG. 1 may execute machine-readable instructions to generate the display.

At block 510, a data timeline is provided, which illustrates an amount of unlabeled data received from the client device and spikes in the data when outlier events may be identified. The timeline may be adjusted in time increments (e.g., 15 minutes, 1 hour, etc.) to illustrate the amount of data received from the client device by the detection system.

At block 520, a number of anomalies detected is provided in a numerical value format. The number of anomalies may correspond with a second label of the set of labels determined by the unsupervised machine learning model.

At block 530, a data label is provided at the display. The data label corresponds with the IP address or host name associated with the data packet. Each new instance of the data label that is included in the new data is repeated on the display as it is received from the client device. In this instance, the data label is repeated four times (blocks 530A, 530B, 530C, 530D).

At block 540, the confidence score is provided. In this example, the confidence score may correspond with the determination that the unlabeled data is outlier data. In other words, the unlabeled data corresponds with data that is previously unlabeled and not similar to other previously labeled data in the system. A correlation may exist between the confidence score and the determination of outlier data, including an instance when the data is not similar to existing data, a subsequent action is recommended to be performed (e.g., to remedy a potential threat).

The confidence scores may be assigned to different colors in accordance with the likelihood that the data received from the client device are outlier data. For example, the data corresponding with a high likelihood that the data are an outlier (e.g., the data are not similar to a preexisting label) may correspond with the color red, the data corresponding with a medium likelihood that the data are an outlier may correspond with the color yellow, and the data corresponding with a low likelihood that the data are an outlier (e.g., the data are somewhat similar to a preexisting label) may correspond with the color green.

Figure 6:
FIG. 6 is an example threat detection display, in accordance with some of the embodiments disclosed herein.

FIG. 6 is an example threat detection display, in accordance with some of the embodiments disclosed herein. In example 600, a display is illustrated with a relabeling queue associated with a label audit process and potential outlier data in association with automated threat detection. In some examples, detection system 102 illustrated in FIG. 1 may execute machine-readable instructions to generate the display.

At block 610, a relabeling queue timeline is provided. In the relabeling queue timeline, true anomalies and false positive anomalies are provided in a chart with respect to the time each data are received during a measured time period.

At block 620, a number of anomalies detected is provided in a numerical value format. The number of anomalies may correspond with a second label of the set of labels determined by the unsupervised machine learning model.

At block 630, a data label is provided at the display. The data label corresponds with the IP address or host name associated with the data packet. Each new instance of the data label that is included in the new data is repeated on the display as it is received from the client device. In this instance, the data label is repeated three times (blocks 630A, 630B, 630C). In this example, the identification of whether the data is a true anomaly or a false positive anomaly are provided as well. The data may be confirmed as an anomaly and correspond with a data characteristic that is not previously identified and labeled by the system.

At block 640, the confidence score is provided. The confidence score in this example is similar to the confidence score provided in FIG. 5 and repeated herein.

Figure 7:
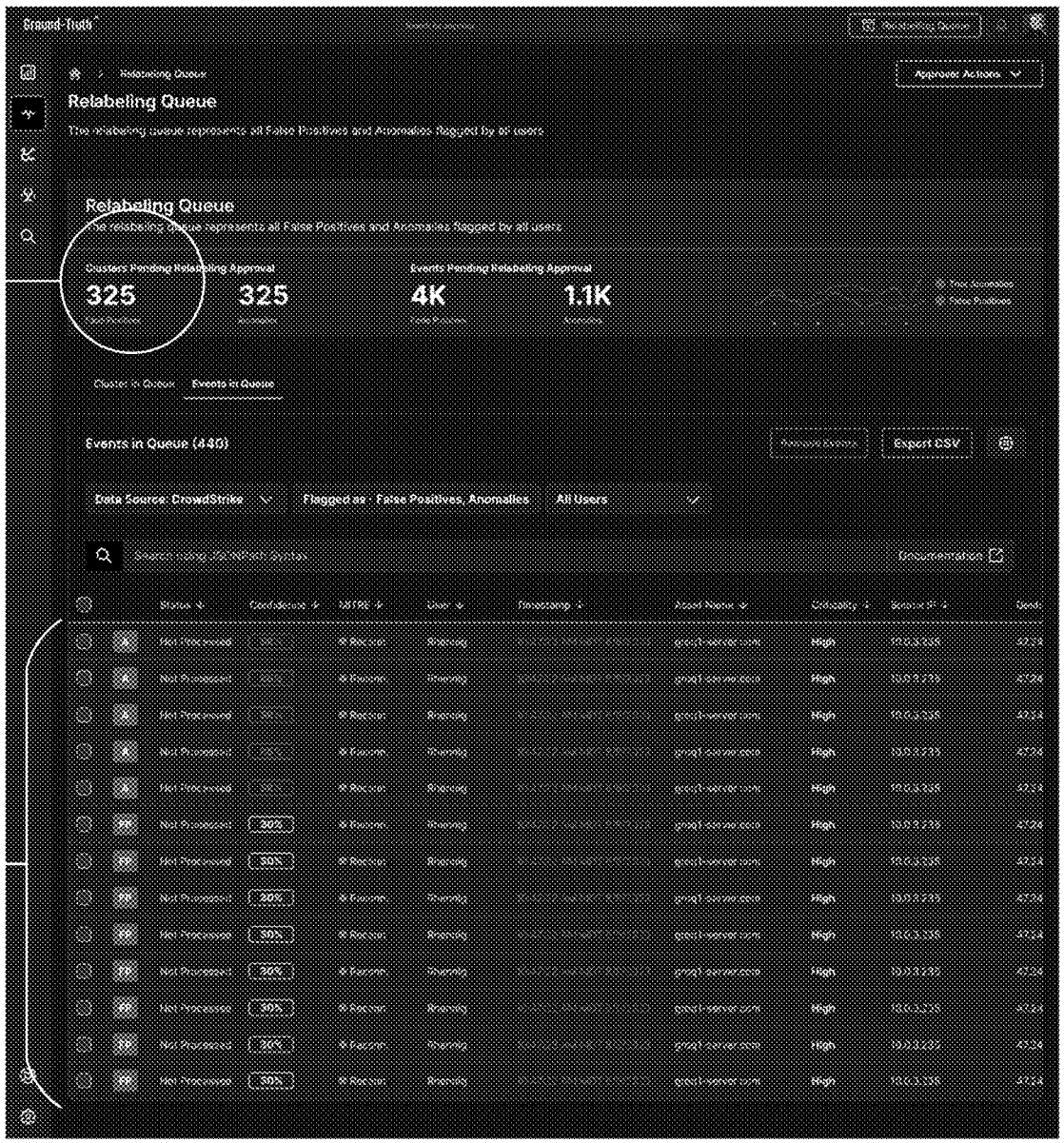
FIG. 7 is an example threat detection display, in accordance with some of the embodiments disclosed herein.

FIG. 7 is an example threat detection display, in accordance with some of the embodiments disclosed herein. In example 700, a display is illustrated with a relabeling queue associated with a label audit process and potential outlier data in association with automated threat detection. In some examples, detection system 102 illustrated in FIG. 1 may execute machine-readable instructions to generate the display.

At block 710, a number of anomalies detected is provided in a numerical value format. The number of anomalies may correspond with a second label of the set of labels determined by the unsupervised machine learning model.

At block 720, individual entries of the relabeling queue are provided. Additional data provided in association with the data label that is not similar to previously assigned data labels is also provided. For example, additional data may include a status (processed or not processed), confidence score (with red/yellow/green label), timestamp that the data was received from the client device, criticality, source IP address (identifying a client device).

FIG. 8 is an example threat detection display, in accordance with some of the embodiments disclosed herein. In example 800, a display is illustrated to show the location of the client device and label that potentially corresponds with outlier data. In some examples, detection system 102 illustrated in FIG. 1 may execute machine-readable instructions to generate the display.

At block 810, the individual entries of the relabeling queue are provided. Additional data provided in association with the data label that is not similar to previously assigned data labels is also provided. For example, additional data may include a source IP address, destination IP address, source port, destination port, protocol (e.g., SSH), bytes of data, and timestamp that the data was received from the client device.

At block 820, the display may provide an interaction tool during the label audit process. During the label auditing process, the display may allow an interaction with the individual label. When an interaction is received (e.g., "yes, this data is properly labeled" or "yes, this data corresponds with a threat"), the process may use the interaction response to revise labels associated with particular data or data characteristics. In some examples, the interaction response is received from a human user and the updated label is provided to retrain the supervised machine learning model.

Figure 9:
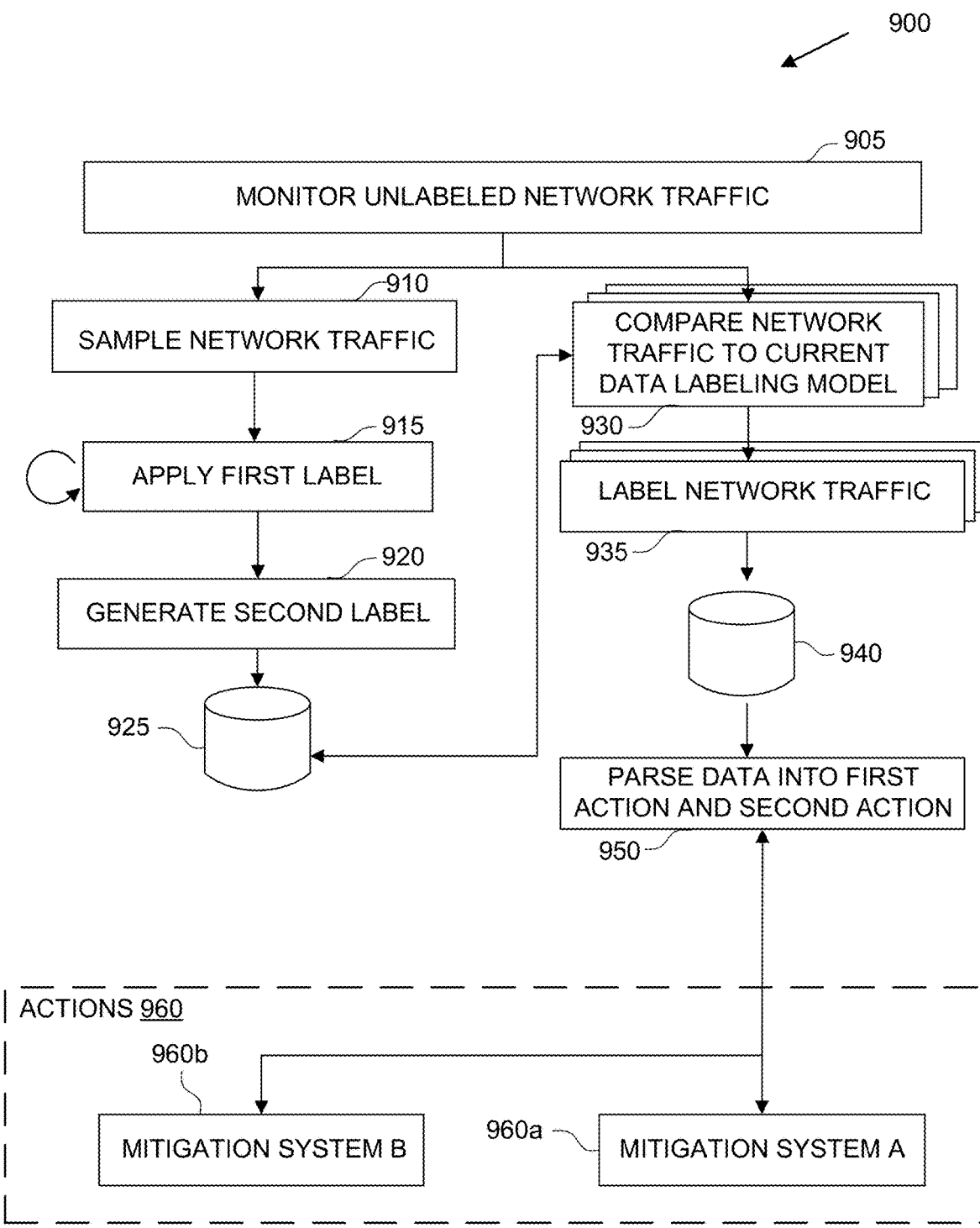
FIG. 9 is a diagram showing a computer method and database connections for monitoring network threats, in accordance with some of the embodiments disclosed herein.

FIG. 9 illustrates a computer method and database connections for monitoring network threats, according to an embodiment. In example 900, In some examples, detection system 102 illustrated in FIG. 1 may execute machine-readable instructions to perform the operations described herein.

At block 905, unlabeled data is monitored in network traffic communications transmitted across the computer network. The process may proceed to block 910 or block 930.

At block 910, a portion of the computer network data transmissions may be received and sampled by detection system 102 of FIG. 1. Receiving the portion of computer network data transmissions may include sampling the unlabeled network traffic communications. The sampling may include less than the entirety of computer network data transmissions. The computer network data transmissions may be characterized by metadata. In some examples, the training portion may introduce latency into the sampled data transmissions. The sampling, or using less than the entirety of the data, may allow the network as a whole to provide low latency data communications by bypassing the training portion of the method. The process may proceed to block 915.

At block 915, a first label may be applied. The first label may be similar to a label assigned to previously-received data, which identifies that the data are similar or comprise similar data characteristics. In some examples, labeling may be derived. For example, a threat labeling model as a function of data transmission parameters to produce a data labeling model. Block 2 915 may be included in a portion of the process 900 characterized as "training".

In some examples, deriving the threat labeling model as a function of data transmission parameters is performed without human supervision and may be performed continuously. In some examples, performing the comparison of the computer network data transmissions to the transmission labeling model is performed at least partly by a quantum or quantum-inspired computer.

In some examples, deriving the threat labeling model as a function of data transmission parameters to produce a data labeling model may include comparing the data transmissions to previously labeled data transmissions, and identifying data transmission metadata that match attributes of the previously labeled data transmissions. For example, the previously labeled data transmissions may include data transmissions previously characterized as Denial of Service (DoS), Remote to User (R2L), User to Root (U2R), and Probing (Probe).

The process may proceed from block 915 to block 920.

At block 920, the data labeling model may be updated. The labels may be updated in label data store 925. Updating the data transmission labeling model 925 to create a current data transmission labeling model. The process may proceed to block 930.

At block 930, network traffic may be compared to the data labeling model. The network traffic may comprise the computer network data transmissions, which can be compared to the data transmission labeling model.

Labeling, with the second server computer, the computer network data transmissions corresponding to the data labeling model in step 935 may be performed as a function of the comparison of the computer network data transmissions to the data transmission labeling model performed in step 930.

In some examples, performing the comparison of the computer network data transmissions to the transmission labeling model in step 930 is performed at least partly by a quantum or quantum-inspired computer.

Comparing the computer network data transmissions to the data transmission labeling model, in step 930, may be performed on all or a majority of computer network data transmissions. This is in contrast to generating the data labeling model, in step 915, being performed using a sample of the computer network data transmissions.

At block 935, a second server computer labels computer network traffic corresponding to the data labeling model to produce a population of threat-labeled computer network traffic.

The threat-labeled computer network traffic may be stored in network traffic data store 940 carried by a non-transitory computer readable medium. Block 935 may be included in a portion of the process 900 characterized as "inference". The process may proceed to block 950.

In some examples, the process comprises displaying on an electronic display, with the server computer, a graphical user interface for presentation to a user (not shown) and receiving, from the user via the graphical user interface, a command to derive the threat labeling model (not shown). The method 900 may further include deriving, with the server computer or the second server computer, a representation of threat identification outcome; and displaying on the electronic display, with the server computer or the second server computer, the representation of threat identification outcome.

In some examples, labeling the computer network traffic corresponding to the data labeling model (using label data store 925) to produce the population of threat-labeled computer network traffic (using network traffic data store 940) includes performing a plurality of processes with a quantum or quantum-inspired computer.

In some examples, labeling the computer network traffic corresponding to the data labeling model (using label data store 925) to produce the population of threat-labeled computer network traffic (using network traffic data store 940) includes converting the data corresponding to unlabeled computer network traffic to a quadratic unconstrained binary optimization (QUBO) problem with a solver program running on the second server computer. The QUBO problem may be served to the quantum or quantum-inspired computer a plurality of times by the solver program. The solver program may combine a plurality of QUBO solutions received from the quantum or quantum-inspired computer to label the computer network traffic. The data labeling model may be converted to one or more QUBO penalty functions by the solver program.

At block 950, threat-labeled network traffic may be parsed into a first action and a second action. Once the data are parsed, the respective sub-populations of threat-labeled network data transmissions may be provided to initiate one or more actions 960. The actions may correspond with transmitting alerts/notifications to various threat mitigation systems (illustrated as first mitigation system 960a and second mitigation system 960b) or initiating remote processing at these systems. The parsing may be performed to deliver the respective sub-populations of threat-labeled network data transmissions to the one or more threat mitigation systems 960a, 960b.

Figure 10:
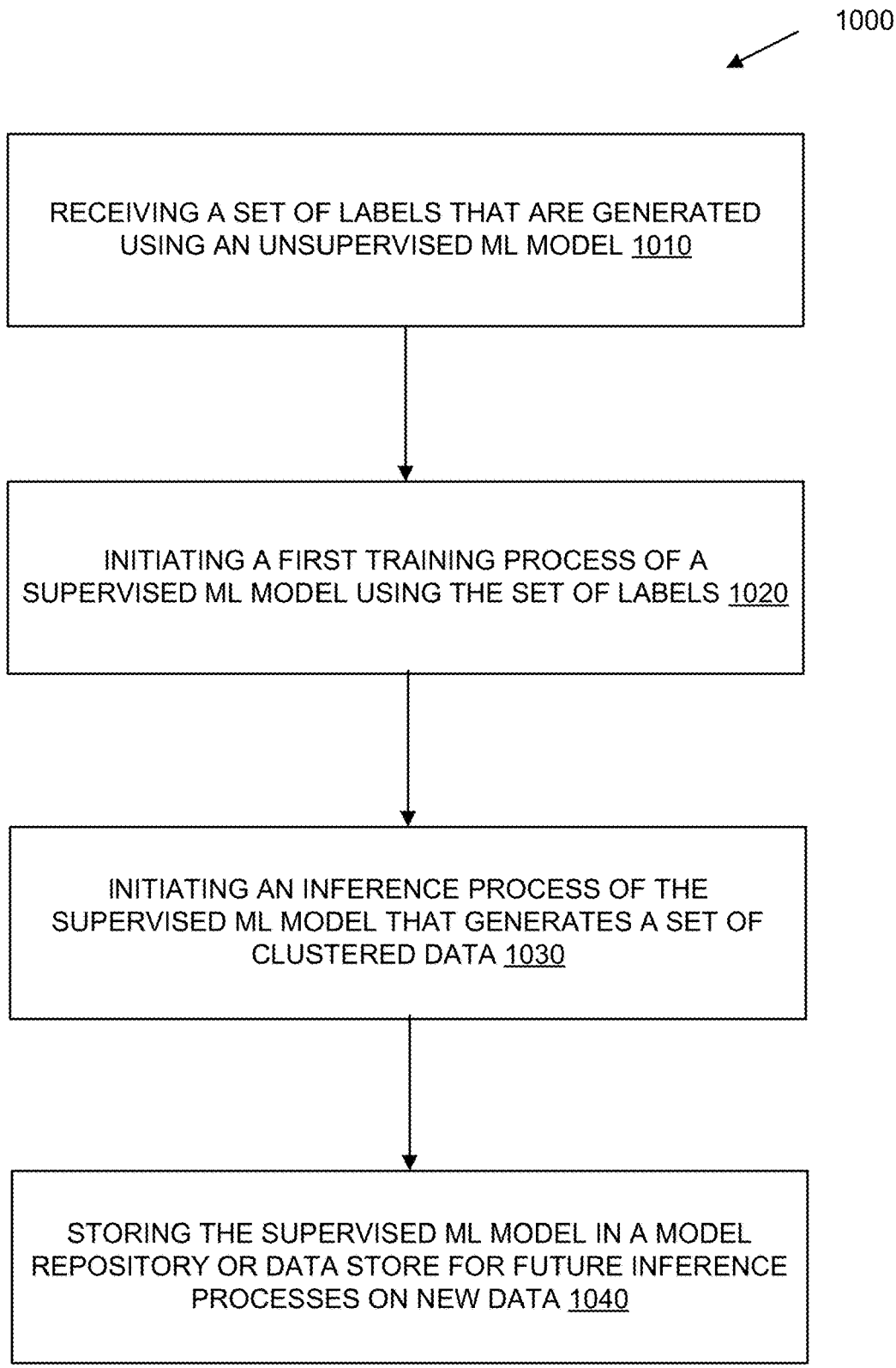
FIG. 10 is a process for performing automated threat detection, in accordance with some of the embodiments disclosed herein.

FIG. 10 is a process for performing automated threat detection, in accordance with some of the embodiments disclosed herein. In example 1000, detection system 102 illustrated in FIG. 1 may execute machine-readable instructions to perform the operations described herein.

At block 1010, the method may receive a set of labels that are generated using an unsupervised machine learning model. The set of labels may be assigned to the unlabeled data using an unsupervised machine learning model to identify normal data or outlier data with respect to previously received data from a client device.

In some examples, the labels are generated by an unsupervised machine learning model on unlabeled data. The unsupervised machine learning model may correspond with clustering (e.g., k-means, hierarchical clustering), dimensionality reduction (e.g., PCA, t-SNE), association rule learning, or other unsupervised machine learning models. When clustering is implemented, the process may identify natural groupings or clusters in the data, based on a data characteristic, and generate a label associated with the data characteristic. When dimensionality reduction is implemented, the process may reduce the number of input variables or features under consideration to simplify the complexity of the dataset by transforming it into a lower-dimensional space while preserving important information. The reduction in the complexity of the dataset may help identify fewer labels by the unsupervised machine learning model. When association rule learning is implemented, the process aims to discover relationships, patterns, or associations within the unlabeled data, and generate a label for the corresponding data.

In some examples, the unsupervised machine learning model may identify new data types in the input data. When new data is identified (e.g., when the characteristics of the data do not match pre-existing data characteristics that are previously assigned to labels), a new or second label may be generated and assigned to the unlabeled data.

In some examples, the unsupervised machine learning model may determine a new or second label associated with outliers in the data. The outlier may correspond with data that is not similar to previously identified activities in the system, including non-fraudulent or fraudulent activities, and a label corresponding with the outlier may be generated and assigned to the data.

At block 1020, the method may initiate a first training process of a supervised machine learning model using the set of labels. The supervised machine learning model may be trained using the set of labels that was determined from the unsupervised machine learning model.

In some examples, the supervised machine learning model may correspond with linear regression, decision trees, support vector machines, neural networks, or other supervised machine learning models. Training the supervised machine learning model may begin by initializing the model with random or predefined parameters that can be adjusted during the training. When the label that was determined from the unsupervised machine learning model is provided as input to the supervised machine learning model, the process iteratively adjusts parameters of the model to minimize the difference between its predictions and the true labels. In some examples, a loss function may also be implemented to quantify the error between the predicted outputs and the true labels. The loss function may be minimized during training.

In some examples, an optimization function is implemented to adjust the parameters of the model iteratively. An illustrative process to adjust the parameters is gradient descent, although various optimization functions may be implemented. In some examples, the gradient of the loss function may be calculated with respect to the model parameters. The parameters may be updated in the opposite direction of the gradient to minimize the loss.

At block 1030, the method may initiate an inference process of the supervised machine learning model that generates a set of clustered data. The trained machine learning model may make predictions or generate outputs for new unlabeled data. For example, once the supervised machine learning model is trained on a labeled dataset (e.g., that has been labeled using the unsupervised machine learning model), the machine learning model can be deployed for inference of the new data.

The inference process may comprise, for example, providing the unlabeled data to the trained model as input. The processing of the data may vary based on the type of model to be associated with the unlabeled data. For example, in a neural network, the model may receive the unlabeled data as input and process it through the layers of the neural network to generate output. The output of the neural network may provide determined similarities between previously received data and new data (e.g., whether the new data is similar or not similar to the previously received data with respect to a similarity threshold). In decision trees, the model may receive the unlabeled data as input and process it through its decision boundaries. In either of these implementations, the model may generate a prediction as output of the unlabeled data.

The supervised machine learning model is configured to generate a set of clusters of labeled data as the prediction/output of the model. In creating the set of clusters, the model may apply the learned patterns and relationships determined during training to the new data. In some examples, the model may generate clustered data with the highest probability of corresponding with the unlabeled data, and group each set of similar data (within a similarity threshold) in the common cluster. In some examples, the output may comprise a confidence score that the data corresponds with the particular cluster (e.g., normal data) or does not correspond with any cluster (e.g., outlier data).

At block 1040, the method may store the supervised machine learning model in a model data store for future inference processes on new data. For example, the trained supervised machine learning model may be stored in a model data store as a trained machine learning model. The trained machine learning model may be used during an inference process when new unlabeled data is received.

Figure 11:
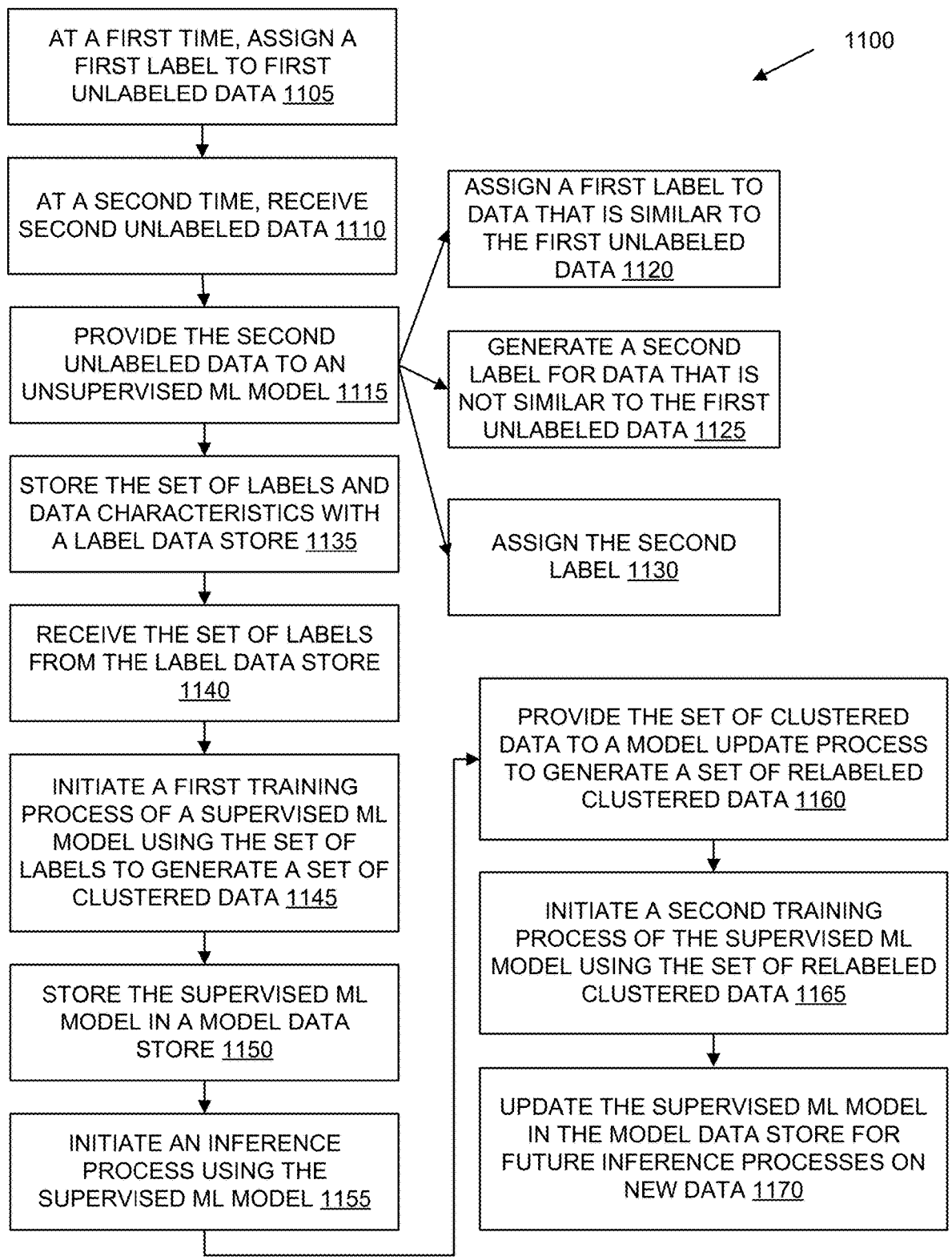
FIG. 11 is a process for performing automated threat detection, in accordance with some of the embodiments disclosed herein.

FIG. 11 is a process for performing automated threat detection, in accordance with some of the embodiments disclosed herein. In example 1100, detection system 102 illustrated in FIG. 1 may execute machine-readable instructions to perform the operations described herein.

At block 1105, the method may assign a first label to first unlabeled data. The first unlabeled data may include a data packet header, payload, or metadata that is added during the transmission of the data. In this sense, the data packet header, payload, or metadata that is added during the transmission of the data may not correspond with the label added by the detection system later in the process. Instead, the label added by the detection system may correspond with data characteristics of the data that can identify the type of data upon analysis of the data packet, and the label added by the detection system may not be provided with the data as it is received by the detection system.

In some examples, the data may comprise various telemetry data, including streaming or batched data. In some examples, the data may include information about the performance, security, status, and behavior of the client device.

The unlabeled data may be received from the client device. The client device may correspond with end user devices, sensors, or software systems. The source of the data may comprise sensors, IoT devices, satellite, third party entities (e.g., Netflow, Zeek, CrowdStrike, vpcFlow, Elk, Splunk, cloud storage sources, Tanium, ICS, SCADA, or Tenable), or other end user devices. The format of the data may comprise a structured format, such as JSON, XML, or binary.

The data may be generated by the client device corresponding to a sensor, IoT device, server, network equipment, or application installed at the client device. In some examples, the source of the data may continuously generate the data, which is transmitted via a network to the detection system. The transmission of the data may be transmitted using different protocols like HTTP, MATT, or custom protocols specific to the application or industry of the particular embodiment.

The first label may be assigned at a first time. In some examples, assigning a first label of a set of labels to first unlabeled data is implemented using an unsupervised machine learning model. As discussed herein, the unsupervised machine learning models may be trained on unlabeled data to assign or generate a label for the unlabeled data. For example, the label may correspond with "1" (e.g., normal data) or "0" (e.g., outlier data) based on the characteristics of the data. In another example, the label may correspond with multiple values, including a value associated with one or more data characteristics (e.g., non-binary label).

At block 1110, the method may receive second unlabeled data. The second unlabeled data may be received at a second time from the client device. The difference in the first time and the second time may help identify what is "normal" data and what is not normal data. The data that is normal may be similar to data received at a first time. Any data that is not similar to the data received at the first time may be outlier data (e.g., not similar). The process for receiving the second unlabeled data may be similar to the features described with block 1105 and otherwise repeated herein.

At block 1115, the method may provide the second unlabeled data to the unsupervised machine learning model. Block 1115 may comprise multiple blocks, including blocks 1120, 1125, and 1130.

At block 1120, the method may assign the first label for data that is similar to the first unlabeled data. The similarities may be based on a set of data characteristics. The first label may be selected from the set of labels and assigned to a first set of the second unlabeled data. In some examples, the data may be similar based on based on shared data characteristics between the first unlabeled data and the second unlabeled data. The label may correspond with "0" (e.g., normal data) or "1" (e.g., outlier data), such that the label is "1" when the data characteristics are different in excess of a similarity threshold and the label is "0" when the data characteristics are the not different in excess of the similarity threshold. In another example, the label may correspond with multiple values, including a value associated with one or more data characteristics (e.g., non-binary label). In some examples, the label is assigned in association with the highest probability with the label (within a similarity threshold) of the particular label. In some examples, the output may comprise a confidence score that the data corresponds with the particular label (e.g., normal data) or does not correspond with any label (e.g., outlier data).

At block 1125, the method may generate a second label for data that is not similar to the first unlabeled data. The similarities/differences may be based on a set of data characteristics, as described herein. The second label may be selected from the set of labels and assigned to a second set of the second unlabeled data.

In some examples, the unsupervised machine learning model may identify new data types that are included with the unlabeled data from the client device. When new data is identified (e.g., when the characteristics of the data do not match pre-existing data characteristics that are previously assigned to labels), a new or second label may be generated and assigned to the unlabeled data. In some examples, the unsupervised machine learning model may determine a new or second label associated with outliers in the data. The outlier may correspond with data that is not similar to previously identified activities in the system, including non-fraudulent or fraudulent activities, and a label corresponding with the outlier may be generated and assigned to the data.

At block 1130, the method may assign the second label for data that is not similar to the first unlabeled data. The assignment of the second label may be similar to the assignment of the first label at block 1120 and otherwise repeated herein.

At block 1135, the method may store the set of labels and the set of data characteristics with a label data store. The labels may be generated using the unsupervised machine learning model.

At block 1140, the method may receive the set of labels from the label data store. For example, the method may access the label data store and provide a search query to receive a subset of data stored in the label data store. In some examples, the search query may return labels corresponding with the search query, including labels that match a data characteristic or data type.

At block 1145, the method may initiate a first training process of a supervised machine learning model. The first training process of the supervised machine learning model may use the set of labels generated by the unsupervised machine learning model. The execution of the supervised machine learning model may generate a set of clustered data.

For example, the supervised machine learning model may correspond with linear regression, decision trees, support vector machines, neural networks, or other supervised machine learning models. Training the supervised machine learning model may begin by initializing the model with random or predefined parameters that can be adjusted during the training. When the label that was determined from the unsupervised machine learning model is provided as input to the supervised machine learning model (e.g., by accessing the label data store), the process iteratively adjusts parameters of the model to minimize the difference between predictions and the true labels. In some examples, a loss function may also be implemented to quantify the error between the predicted outputs and the true labels. The loss function may be minimized during training.

In some examples, an optimization function is implemented to adjust the parameters of the model iteratively. An illustrative process is gradient descent, although various optimization functions may be implemented. In some examples, the gradient of the loss function may be calculated with respect to the model parameters. The parameters may be updated in the opposite direction of the gradient to minimize the loss.

At block 1150, the method may store the supervised machine learning model in a model data store. For example, the trained supervised machine learning model may be stored in a model data store. The trained supervised machine learning model may be accessed to implement an inference process when new unlabeled data is received.

At block 1155, the method may initiate an inference process using the supervised machine learning model. In some examples, the data is used to infer threats and to help implement automated threat detection. In some examples, after the unlabeled data is ingested, the data may be partitioned and provided for preprocessing. The ingesting/preprocessing may remove specific subsets of data based on predefined criteria, combine information from multiple individual data points in the unlabeled data, or convert the data to a different data type or protocol/format or added with missing values. In some examples, the data may be split so that a first portion of the data is used for training and a second portion of the data is used for inference. The output of the inference process may generate the set of clustered data.

In some examples, the inference process includes preprocessing. Various preprocessing methods may be implemented. For example, the inference process may implement feature scaling to adjust the scale of the features to correspond to a similar range as each other. In some examples, the preprocessing includes dimensionality reduction to reduce the number of input features while preserving important information. The identification and reduction of input features may be implemented using PCA or other feature selection methods. In some examples, the inference process normalizes the data from the ingesting process to help ensure that the incoming data is in the same format and range as the data used during model training. In some examples, the preprocessing may generate new data using oversampling, undersampling, or using weighted classes to handle imbalanced data. The imbalanced data may exist in the distribution of clusters or other groupings of data. The newly generated data may help prevent biased inferences as output.

The label associated with the data may be used to access a corresponding supervised machine learning model stored in the model data store. As one illustrative example, particular telemetry data may be associated with a particular supervised machine learning model stored in the model data store. When new telemetry data is received that is similar to the previously received telemetry data, the new telemetry data may also be associated with the particular supervised machine learning model and the new data may be provided as input to the supervised machine learning model.

At block 1160, the method may provide the set of clustered data to a label audit process for relabeling the set of clustered data. During the label auditing process, the process may update labels associated with particular data or data characteristics. For example, the data associated with the label may be measured for similarity. The data value that is greater than a predetermined similarity threshold value may be provided for further review. In some examples, additional labels may be added by a human user to output from the supervised machine learning model. The output of the label audit process may generate a set of relabeled clustered data.

In some examples, the labels that are determined during the label auditing process may be provided back to the supervised machine learning model to retrain the unsupervised machine learning model during a second training process. The retrained supervised machine learning model may be stored in the model data store and/or provided for future inference processes on new data. The output from the label auditing may be used to implement automated detection of potential threats. The newly-discovered potential threats may be provided for analysis and inclusion in the unsupervised ML model (e.g., for labeling) and supervised ML model (e.g., for clustering/grouping).

At block 1165, the method may initiate a second training process of the supervised machine learning model. For example, the supervised machine learning model may correspond with linear regression, decision trees, support vector machines, neural networks, or other supervised machine learning models. The retraining of the supervised machine learning model may begin with the predefined parameters from the first training process that are adjusted during the retraining. When the updated label that was determined from the unsupervised machine learning model is provided as input to the supervised machine learning model, the process iteratively adjusts parameters of the model to minimize the difference between its predictions and the true labels. In some examples, a loss function may also be implemented to quantify the error between the predicted outputs and the true labels. The loss function may be minimized during retraining. The second training process may use the set of relabeled clustered data to update/retrain the supervised machine learning model.

In some examples, the unsupervised machine learning model may also be retrained to determine labels based on determination from the label auditing process that may correspond with the fraudulent activity. The retrained model may be updated. Using the retrained model, any new data that is received/ingested may be received by unsupervised machine learning model. The pre-existing labeled data can be clustered with the previously-identified clusters and any new data that is not clustered can be identified as a new outlier.

At block 1170, the method may update the supervised machine learning model in the model data store for future inference processes on new data. For example, the output from the label auditing may be used to retrain the model and initiate future inference processes to implement automated detection of potential threats. The newly-discovered potential threats may be provided to a supervised machine learning module for analysis and inclusion in the ML model.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

The process may be implemented by a computer system. The computer system may include a bus or other communication mechanism for communicating information, one or more hardware processors coupled with the bus for processing information. The hardware processor(s) may be, for example, one or more general purpose microprocessors.

The computer system also includes a main memory, such as a random access memory (RAM), cache and/or other dynamic storage devices, coupled to the bus for storing information and instructions to be executed by the processor. The main memory also may be used for storing temporary variables or other intermediate information during execution of instructions to be executed by the processor. Such instructions, when stored in storage media accessible to the processor, render the computer system into a special-purpose machine that is customized to perform the operations specified in the instructions.

The computer system further includes a read only memory (ROM) or other static storage device coupled to the bus for storing static information and instructions for the processor. A storage device, such as a magnetic disk, optical disk, or thumb drive, may be coupled to the bus for storing information and instructions.

The computer system may be coupled via the bus to a display, such as a liquid crystal display (LCD), for displaying information to a computer user. An input device, including alphanumeric and other keys, is coupled to the bus for communicating information and command selections to the processor. Another type of user input device is a mouse, a trackball, or cursor direction keys for communicating direction information and command selections to the processor and for controlling cursor movement on the display. In some embodiments, the same direction information and command selections as cursor control may be implemented via receiving touches on a touch screen without a cursor.

The computing system may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system may implement the techniques described herein using customized hard-wired logic, one or more ASICs or FPGAs, firmware and/or program logic which in combination with the computer system causes or programs the computer system to be a special-purpose machine. According to one embodiment, the techniques herein are performed by the computer system in response to the processor(s) executing one or more sequences of one or more instructions contained in the main memory. Such instructions may be read into the main memory from another storage medium. Execution of the sequences of instructions contained in the main memory causes the processor(s) to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks. Volatile media includes dynamic memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise a bus. Transmission media can also take the form of acoustic or light waves, such as those generated during radio-wave and infra-red data communications.

The computer system also includes a communication interface coupled to the bus. The interface provides a two-way data communication coupling to one or more network links that are connected to one or more local networks. For example, the interface may be an integrated services digital network (ISDN) card, cable modem, satellite modem, or a modem to provide a data communication connection to a corresponding type of telephone line. As another example, the interface may be a local area network (LAN) card to provide a data communication connection to a compatible LAN (or WAN component to communicated with a WAN). Wireless links may also be implemented. In any such implementation, the interface sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network links and through an interface, which carry the digital data to and from the computer system, are example forms of transmission media.

The computer system can send messages and receive data, including program code, through the network(s), network links, and interfaces. In the Internet example, a server might transmit a requested code for an application program through the Internet, the ISP, the local network and the interface.

The received code may be executed by the processor as it is received, and/or stored in the storage device, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for performing threat detection comprising:
   at a first time, assigning, by a detection system, a first label of a set of labels to first unlabeled data using an unsupervised machine learning model;
   at a second time, receiving, by the detection system and from a client device, second unlabeled data;
   providing, by the detection system, the second unlabeled data to the unsupervised machine learning model to:
      assign the first label of the set of labels to a first set of the second unlabeled data that is similar to the first unlabeled data based on a set of data characteristics,
      generate a second label of the set of labels for a second set of the second unlabeled data that is not similar to the first unlabeled data based on the set of data characteristics, and
      assign the second label of the set of labels to the second set of the second unlabeled data;
   storing, by the detection system, the set of labels and the set of data characteristics with a label data store;
   receiving, by the detection system, the set of labels from the label data store;
   initiating, by the detection system, a first training process of a supervised machine learning model using the set of labels from the unsupervised machine learning model, wherein execution of the supervised machine learning model generates a set of clustered data;
   initiating, by the detection system, an inference process of the supervised machine learning model, wherein output of the inference process generates the set of clustered data;
   providing, by the detection system, the set of clustered data to a label audit process for relabeling the set of clustered data, wherein the label audit process generates a set of relabeled clustered data;
   initiating, by the detection system, a second training process of the supervised machine learning model using the set of relabeled clustered data to update the supervised machine learning model; and
   updating, by the detection system, the supervised machine learning model in a model data store for future inference processes on new data.

2. The method of claim 1, wherein the label audit process is based on an automatically generated label determined by the unsupervised machine learning model using a data characteristic from the set of data characteristics of the second unlabeled data received from the client device.

3. The method of claim 1, wherein the label audit process is based on a human-generated label.

4. The method of claim 1, wherein the label audit process is a weighted combination of a human-generated label and an automatically generated label determined by the unsupervised machine learning model.

5. The method of claim 1, further comprising:
   analyzing the first unlabeled data for balancing a distribution of values in the first unlabeled data;
   initiating a random stratified sampling process to generate new second data; and
   adding the new second data to the first unlabeled data.

6. The method of claim 1, wherein the supervised machine learning model is selected for the inference process based on a machine learning label corresponding with the second label of the set of labels to the second set of the second unlabeled data.

7. The method of claim 1, further comprising:
   initiating an action based on the set of relabeled clustered data.

8. The method of claim 7, wherein the action comprises updating a display that identifies an inference associated with the second unlabeled data.

9. The method of claim 7, wherein the action comprises sending a notification to remove the client device from communicating with a detection system via a network.

10. The method of claim 7, wherein the action comprises adding a portion of the set of relabeled clustered data to an outlier queue for further review.

11. The method of claim 1, wherein the second label associated with the second unlabeled data is a data anomaly or outlier data.

12. The method of claim 1, wherein the first unlabeled data and the second unlabeled data comprise telemetry data.

13. A detection system comprising:
   a memory; and
   a processor configured to execute machine readable instructions stored in the memory for causing the processor to:
      at a first time, assign a first label of a set of labels to first unlabeled data using an unsupervised machine learning model;
      at a second time, receive, from a client device, second unlabeled data;
      provide the second unlabeled data to the unsupervised machine learning model to:
         assign the first label of the set of labels to a first set of the second unlabeled data that is similar to the first unlabeled data based on a set of data characteristics, generate a second label of the set of labels for a second set of the second unlabeled data that is not similar to the first unlabeled data based on the set of data characteristics, and assign the second label of the set of labels to the second set of the second labeled data;

store the set of labels and the set of data characteristics with a label data store;

receive the set of labels from the label data store;

initiate a first training process of a supervised machine learning model using the set of labels from the unsupervised machine learning model, wherein execution of the supervised machine learning model generates a set of clustered data;

initiate an inference process of the supervised machine learning model, wherein output of the inference process generates the set of clustered data;

provide the set of clustered data to a label audit process for relabeling the set of clustered data, wherein the label audit process generates a set of relabeled clustered data;

initiate a second training process of the supervised machine learning model using the set of relabeled clustered data to update the supervised machine learning model; and update the supervised machine learning model in a model data store for future inference processes on new data.

14. The detection system of claim 13, wherein the label audit process is based on an automatically generated label determined by the unsupervised machine learning model using a data characteristic from the set of data characteristics of the second unlabeled data received from the client device.

15. The detection system of claim 13, wherein the label audit process is based on a human-generated label.

16. The detection system of claim 13, wherein the label audit process is a weighted combination of a human-generated label and an automatically generated label determined by the unsupervised machine learning model.

17. The detection system of claim 13, wherein the processor is further caused to:

initiate an action based on the set of relabeled clustered data.

18. The detection system of claim 13, wherein the second label associated with the second unlabeled data is a data anomaly or outlier data.

19. The detection system of claim 13, wherein the first unlabeled data and the second unlabeled data comprise telemetry data.

20. A non-transitory computer-readable storage medium storing a plurality of instructions executable by one or more processors, the plurality of instructions when executed by the processor causes the processor to:

at a first time, assign a first label of a set of labels to first unlabeled data using an unsupervised machine learning model;

at a second time, receive, from a client device, second unlabeled data;

provide the second unlabeled data to the unsupervised machine learning model to:

assign the first label of the set of labels to a first set of the second unlabeled data that is similar to the first unlabeled data based on a set of data characteristics, generate a second label of the set of labels for a second set of the second unlabeled data that is not similar to the first unlabeled data based on the set of data characteristics, and assign the second label of the set of labels to the second set of the second unlabeled data;

store the set of labels and the set of data characteristics with a label data store;

receive the set of labels from the label data store;

initiate a first training process of a supervised machine learning model using the set of labels from the unsupervised machine learning model, wherein execution of the supervised machine learning model generates a set of clustered data;

initiate an inference process of the supervised machine learning model, wherein output of the inference process generates the set of clustered data;

provide the set of clustered data to a label audit process for relabeling the set of clustered data, wherein the label audit process generates a set of relabeled clustered data;

initiate a second training process of the supervised machine learning model using the set of relabeled clustered data to update the supervised machine learning model; and update the supervised machine learning model in a model data store for future inference processes on new data.

* * * * *

UNITED STATES PATENT AND TRADEMARK OFFICE
CERTIFICATE OF CORRECTION

| | | |
|---|---|---|
| PATENT NO. | : 12,432,230 B2 | Page 1 of 1 |
| APPLICATION NO. | : 18/510490 | |
| DATED | : September 30, 2025 | |
| INVENTOR(S) | : Haibo Wang et al. | |

It is certified that error appears in the above-identified patent and that said Letters Patent is hereby corrected as shown below:

In the Claims

Column 29, Line 6, (Claim 13, Line 22), change "labeled" to --unlabeled--.

Signed and Sealed this
Eighteenth Day of November, 2025

John A. Squires
*Director of the United States Patent and Trademark Office*